April 28, 1936.   A. Y. DODGE   2,039,149
ONE-WAY CLUTCH
Filed Dec. 5, 1932   2 Sheets-Sheet 1
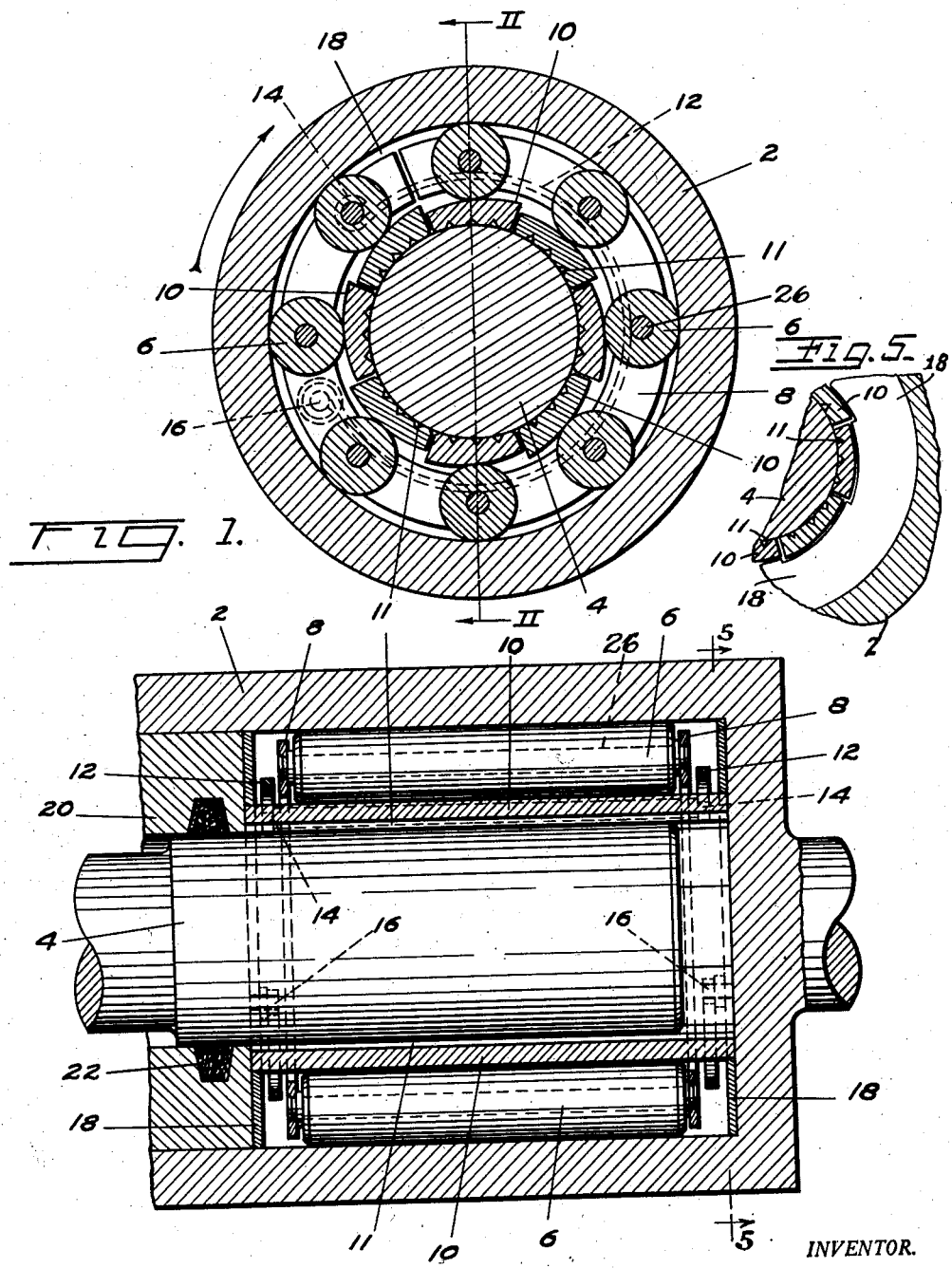
INVENTOR.
A. Y. Dodge April 28, 1936. A. Y. DODGE 2,039,149
ONE-WAY CLUTCH
Filed Dec. 5, 1932 2 Sheets-Sheet 2

INVENTOR.
Adolph Y. Dodge

Patented Apr. 28, 1936

2,039,149

UNITED STATES PATENT OFFICE 2,039,149

ONE-WAY CLUTCH

Adiel Y. Dodge, South Bend, Ind.

Application December 5, 1932, Serial No. 645,665

10 Claims. (Cl. 192—45)

This invention relates to improvements in one-way clutches.

An object of the invention is to provide an improved clutch or free wheeling device.

Another object is to provide a one-way clutch employing rollers and means to relieve the rollers of sliding and rolling loads.

A further object is to provide a one-way clutch having very little back lash and having that back lash cushioned by an oil film.

A still further object is to provide a one-way clutch of simple, durable and reliable construction.

Other objects, the advantages and uses of the invention will be or should be apparent after reading the following description and claims and after considering the accompanying drawings, in which:

Fig. 1 is an end view in section through the axis of the shaft;

Fig. 2 is a sectional view in elevation along the line II—II of Fig. 1;

Figure 5 is a partial section on the line 5—5 of Figure 2, showing the end construction.

Figure 3:
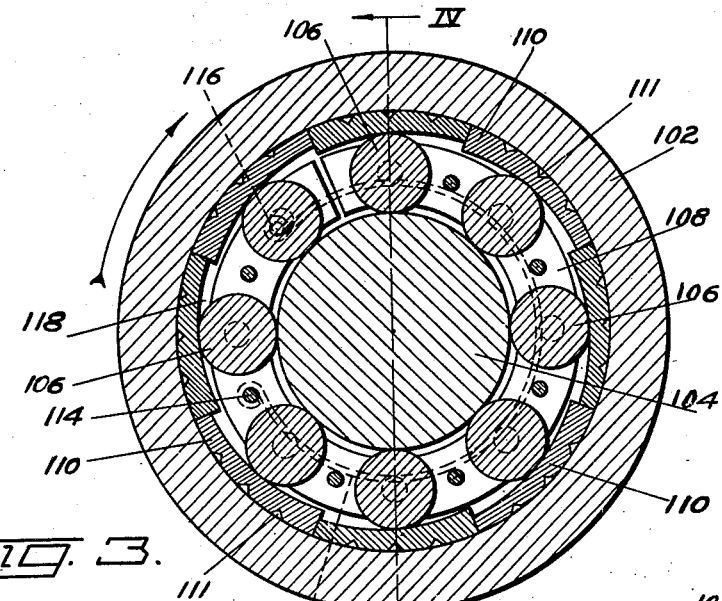
Fig. 3 is a view similar to Fig. 1 showing a modified arrangement of parts.

In general, shaft 4 is preferably the driven member and the cylindrical housing 2 is preferably the driving member. Wedge blocks 10 are separate and are shaped to fit in place as shown. Parts 8 are end members of a suitable cage for rollers 6. It will be noted that there is one of the wedge blocks 10 for each of the rollers 6. Parts 18 are ratchet shaped discs shaped to closely but freely fit the contour of the assembled wedges 10 and part 12 is a leaf or torsion spring connected between pins 14 and 16 mounted respectively on parts 8 and 18.

Referring particularly to Figs. 1 and 2 wherein is shown the preferred embodiment of my invention, the equally spaced rollers 6 contact with the cylindrical housing 2 and respectively with the corresponding ones of the wedge blocks 10. The wedge blocks 10 contact shaft 4 and the corresponding rollers 6. Spring 12 urges these members into contact by tending to revolve the wedge blocks one-way and the roller cage the opposite way. The roller cage comprising ends 8 urges the rollers with it, thus tending to cause the rollers to roll up the incline on the corresponding wedge blocks 10, and maintain a snug contact between all of the various parts. This spring load causes the rollers and wedge blocks to have a pre-load or an excitation load necessary in devices of this nature, but this loading has a special character which will be described later.

The wedge blocks are provided with oil grooves 11 so that the oil film may be more readily squeezed from under the wedge blocks 10 when the device is about to transmit load. Grooves 11 also help to distribute oil when over-running takes place. It is proposed that this device shall run partly filled or submerged in lubricant the housing preferably being closed by an end member as shown at 20 in Figures 1 and 2 and at 120 in Figures 3 and 4 and having packings 22 and 122 respectively sealing the shaft 4. Attention is called to the fact that the rollers in this device are not called upon to roll while the clutch is over-running nor are they subjected to sliding friction. Sliding friction takes place between the shaft 4 and the wedge blocks 10, thus relieving the rollers and their contact surfaces from sliding or rolling friction during this time. Attention is also called to the fact that shaft 4 is enlarged in order to give a greater radius at the friction surface.

In operation, preferably the outer member 2 is the driving member connected to the source of power. Shaft 4 is preferably the driven member. When the driving member 2 tends to turn faster than the driven member 4, rollers 6 have a tendency to roll up the incline of the corresponding wedge blocks 10, thus creating a heavy radial load with a tendency to continually increase as movement takes place between the outer driving and inner driven members. It is by means of this heavy radial load that sufficient friction is produced to create a unit drive between the driving and driven members. On the other hand, when the driven member 4 tends to turn faster than the driving member 2, the wedge blocks have a tendency to move such that the rollers descend the inclines. In this way, the heavy radial load is relieved. When the heavy radial load has been decreased slippage between the shaft 4 and wedge blocks takes place.

Figure 4:
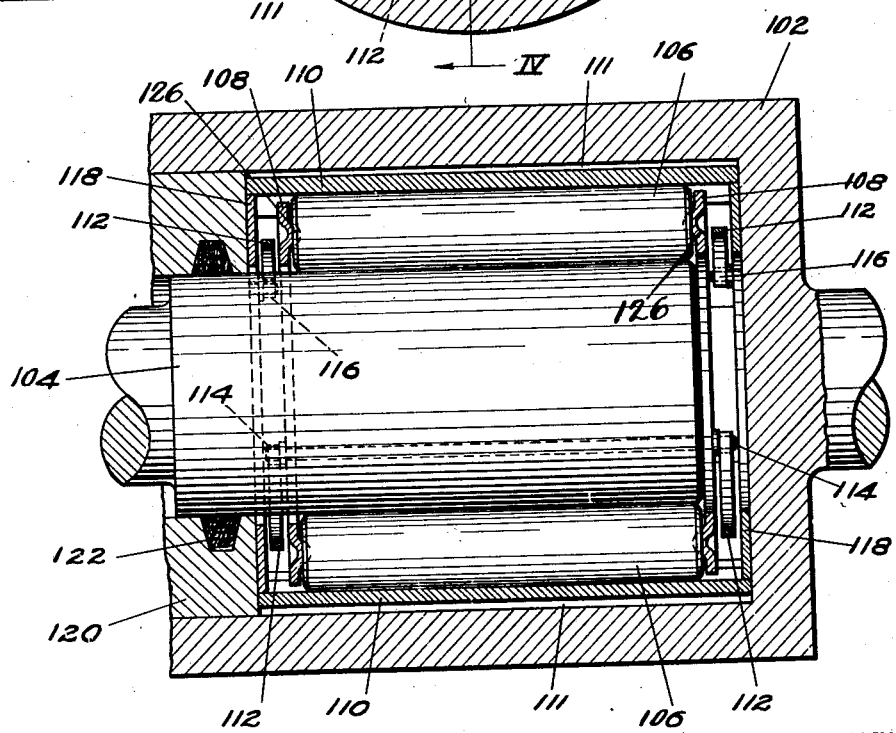
Fig. 4 is a sectional view in elevation along the line IV—IV of Fig. 3.

As a further precaution against slippage taking place between the rollers, the roller cage ends 8 are parted so that these ring-like members may be made to yield a force against the rollers and the rollers against the outer sleeve. This is accomplished by using spring material in the ends 8. The natural diameter of the roller and cage assembly is slightly larger when free than it is after the roller and cage assembly is forced into place. The roller cage ends may communicate with the rollers by means of a center point bearing 126 as shown in Fig. 4 or by means of a shaft 26 running through each of the rollers as shown in Fig. 2. In addition, to the springing tendency of the cage to force the rollers against their outer raceway, there is provided the leaf spring 12 which has a yielding tendency to draw the roller cage and, therefore, the rollers in one direction while urging the wedge blocks in an opposite direction. By this means the back lash is taken up and a close contact between rollers, the outer race, the wedge blocks and the shaft maintained. This is accomplished by connecting one end of the leaf springs 12 to the roller cage by means of the pins 14 and the other end to the disks 18 having a contour which fits over the wedge blocks, by means of the pins 16.

It will be seen from this that when the one-way clutch is standing without load all parts are held snugly in engagement, but should an over-running load occur, the over-running load itself will tend to coil spring 12, thereby tending to reverse the tendency of the force of the spring until a balance of forces is had. The drag of over-running works directly against the spring load, thereby reducing the spring load during over-running. The force imposed in the spring should be somewhat greater than the force necessary to overcome the resistance of drag between the wedge blocks and the shaft.

When over-running starts oil will be distributed from the oil grooves 11 to form an oil film on the shaft. In this way the wedge blocks are subjected to a comparatively light bearing load during overrunning due to spring action, the spring load being not sufficient to prevent a satisfactory oil film to accumulate and be maintained between wedge blocks and shaft. When over-running ceases and a relative state of rest exists between the driving and driven parts the oil film will start to thin out due to the spring pressure, oil being pushed out through the oil grooves. As soon as the driving load starts an increased pressure is effected, as previously described, upon the wedge blocks. As this pressure increases the oil film is completely pushed out through the oil grooves. During this short interval of time, the oil film has acted as a cushion so that what little effective back lash exists is dampened and an impact load avoided.

In installations where both parts are apt to be revolving at high speeds it may become desirable to place the wedge blocks at the outer extremity to insure satisfactory lubrication. The centrifugal force set up in the lubricant has a tendency to carry the oil away from the center and toward the outside. However, with the wedge blocks placed in contact at the larger diameter, there is a greater tendency for slippage to take place between the rollers and their contact surface during over-running. Therefore, in this construction it becomes advisable to incorporate a heavier spring load in the cage ends 8.

A construction of this sort is shown in Figures 3 and 4, in which the various parts corresponding to the parts in Figures 1 and 2 are indicated by reference characters 100 greater than the characters used in Figures 1 and 2.

In this case the wedge blocks 110 are forced outwardly against the housing 102 by their respective rollers 106, and spring washers 108 tend to contract the rollers upon the shaft 104 instead of urging them outwardly as in the first embodiment.

It is to be understood that the embodiments of the invention herein set forth are presented for the purpose of illustration only, and various changes may be made therein without departing from the spirit and scope of the appended claims.

I claim:
1. An over-running clutch comprising coaxial outer and inner members, a series of wedge blocks each having on one side a cylindrical surface adapted to be forced into frictional engagement with one of said members and having a wedge surface on its opposite side, a corresponding series of rollers, each arranged between the other of said members and the wedge surface of one of said blocks, and means urging said rollers away from said blocks said means being independent of the blocks.

2. An over-running clutch comprising coaxial outer and inner members, a series of wedge blocks each having on one side a cylindrical surface adapted to be forced into frictional engagement with one of said members and having a wedge surface on its opposite side, a corresponding series of rollers having a cage, each arranged between the other of said members and the wedge surface of one of said blocks, and means acting on said cage and yieldingly urging the series of wedge blocks in one direction and the series of rollers in the other direction in such a manner as to cause the rollers to tend to wedge between said other member and the wedge surfaces of their respective blocks and means urging said rollers away from said blocks.

3. An over-running clutch comprising coaxial outer and inner members, a series of wedge blocks each having on one side a cylindrical surface adapted to be forced into frictional engagement with one of said members and having a wedge surface on its opposite side, a corresponding series of rollers, each arranged between the other of said members and the wedge surface of one of said blocks, and means connecting the opposite ends of the rollers and forming a cage for said rollers and urging the rollers yieldingly radially away from said blocks.

4. An over-running clutch comprising coaxial outer and inner members, a series of wedge blocks each having on one side a cylindrical surface adapted to be forced into frictional engagement with one of said members and having a wedge surface on its opposite side, a corresponding series of rollers, each arranged between the other of said members and the wedge surface of one of said blocks, and means connecting the opposite ends of the rollers and forming a cage for said rollers, together with spring means tensioned between said cage and the series of wedge blocks and tending to turn them in opposite directions to cause the rollers to tend to wedge between said other member and the wedge surfaces of their respective blocks.

5. An over-running clutch comprising coaxial outer and inner members, a series of wedge blocks each having on one side a cylindrical surface adapted to be forced into frictional engagement with one of said members and having a wedge surface on its opposite side, a corresponding series of rollers, each arranged between the other of said members and the wedge surface of one of said blocks, and means connecting the opposite ends of the rollers and forming a cage for said rollers, said means comprising yielding members resiliently urging the rollers radially against said other member.

6. An over-running clutch comprising coaxial outer and inner members, a series of wedge blocks each having on one side a cylindrical surface adapted to be forced into frictional engagement with one of said members and having a wedge surface on its opposite side, a corresponding series of rollers, each arranged between the other of said members and the wedge surface of one of said blocks, and means connecting the opposite ends of the rollers and forming a cage for said rollers, said means comprising split spring washers resiliently urging the rollers radially against said other member and between which the rollers are pivotally mounted.

7. An over-running clutch comprising coaxial outer and inner members, a series of blocks each having a cylindrical surface frictionally engageable with one of said members and formed with oil grooves, and each having a wedge surface on its opposite side, means urging said blocks toward said one member but not strongly enough to break an oil film thereon unaided, and a corresponding series of rollers each of which is arranged to wedge between the other of said members and the wedge surface of one of the blocks and to force the oil of the film on said one member out through said grooves and means independent of said first named means for urging said rollers against said other member.

8. A roller and cage subassembly for an over-running clutch comprising a pair of resilient split rings forming expansible and contractable springs, and a series of rollers arranged between and having their ends rotatably journaled in said rings.

9. A subassembly for an over-running clutch comprising an annular series of wedge blocks, each having a cylindrical side and a wedge side, and a pair of washers shaped generally like ratchets and fitting closely over the wedge sides of said blocks adjacent their opposite ends.

10. An over-running clutch comprising an annular series of wedge blocks, each having a cylindrical side and a wedge side, a pair of washers shaped generally like ratchets and fitting closely over the wedge sides of said blocks adjacent their opposite ends, a series of rollers, one opposite the wedge side of each block, members forming a cage for said rollers, and springs tensioned between each of said members and the corresponding one of said washers.

ADIEL Y. DODGE.